United States Patent [19]
Koh et al.

[11] Patent Number: 5,944,180
[45] Date of Patent: *Aug. 31, 1999

[54] SELF-EJECTING COMPACT DISC CASE

[76] Inventors: Lawrence Robert Koh, 11755 Wilshire Blvd. 9th Fl., Los Angeles, Calif. 90025; Arthur Mark Feuerborn, 355 Lantana, Suite 777, Camarillo, Calif. 93010; David John Feuerborn, P.O. Box 498, Camarillo, Calif. 93011

[*] Notice: This patent is subject to a terminal disclaimer.

[21] Appl. No.: 08/916,460

[22] Filed: Aug. 22, 1997

Related U.S. Application Data

[62] Division of application No. 08/585,168, Jan. 11, 1996, Pat. No. 5,695,053.

[51] Int. Cl.⁶ .................................................. B65D 85/30
[52] U.S. Cl. ...................... 206/308.1; 206/312; 312/9.19
[58] Field of Search ................................ 206/308.1, 309, 206/312, 313, 387.12; 312/9.17, 9.19, 9.22; 221/87

[56] References Cited

U.S. PATENT DOCUMENTS 4,747,484  5/1988  Ackeret .................................... 206/387
5,168,991  12/1992  Whitehead et al. ..................... 206/310
5,676,246  10/1997  Gloger .................................. 206/308.1

FOREIGN PATENT DOCUMENTS

WO 093016471  8/1993  Australia ............................. 206/308.1

*Primary Examiner*—Paul T. Sewell
*Assistant Examiner*—Nhan T. Lam
*Attorney, Agent, or Firm*—Gene W. Arant; Larry D. Baker

[57] ABSTRACT

A storage case for a flat circular Niger such as a compact disc includes a plastic box that has top and bottom walls and a front end which in open so that the flat circular maker may be inserted into the box between the top and bottom walls. A spring member inside the box adjacent its rear wall has one part that is fixedly secured to the box, and a movable part that when released can directly engage the peripheral edge of the flat circular member. The movable part of the spring member is normally stored in a retracted position behind a rib that extend inwardly from the top wall of the box. The top wall has a flexible portion behind the rib which is downwardly depressible for releasing the movable part of the spring member so that it will then engage the compact disc and eject it from the open front end of the box.

5 Claims, 5 Drawing Sheets

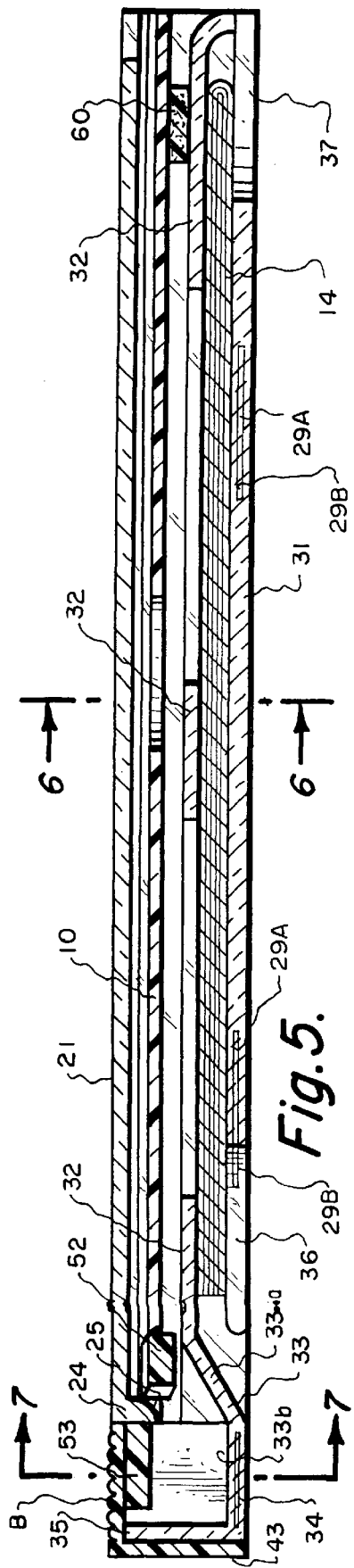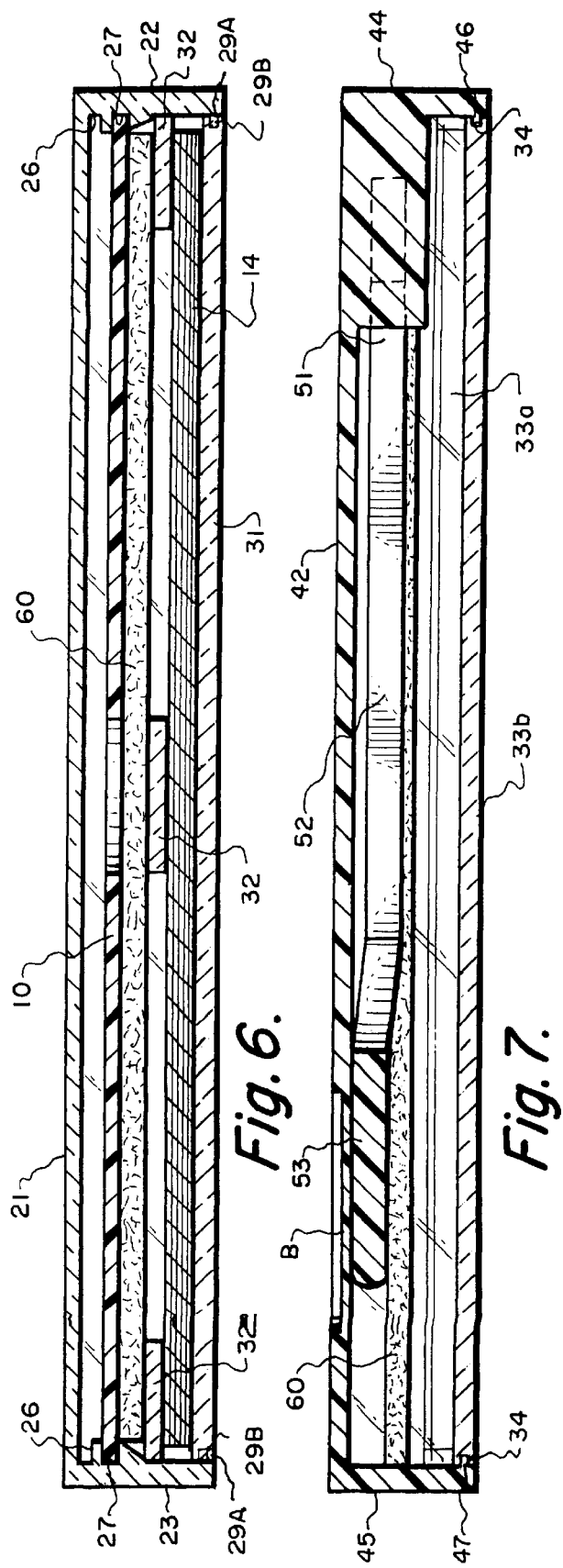

SELF-EJECTING COMPACT DISC CASE

The following application is a Divisional of U.S. patent application Ser. No. 08/585,168 filed Jan. 11, 1996 issued as U.S. Pat. No. 5,695,053.

FIELD OF THE INVENTION

The present invention relates to a package for distribution and sale of compact discs or CDs, and in which the buyer can store a disc both before and after it has been played.

BACKGROUND OF THE INVENTION

Compact discs are now manufactured, sold, and used in very large volume. It is a prevailing practice to package the discs on an individual basis. During shipment and prior to sale there are important requirements for protecting the discs, with respect both to physical damage to the disc itself and also possible contamination of the disc by dirt entering the package. It is customary to provide a shrink-wrapped plastic cover for the package in which the disc is contained, leaving the ultimate buyer to first remove the plastic cover before taking the disc our of the package.

Further, the package must be functionally effective for the ultimate consumer, not only for storage of the disc prior to use, but for re-storing the disc after it has been played. Ease of retrieving the disc from the package, and later returning it to the package, are important.

SUMMARY OF THE INVENTION

According to the present invention a storage case for a flat circular member such as a compact disc or CD has an open forward end and a closed rearward end, and has an ejection spring contained within its rearward end. A mechanism is provided for normally storing the ejection spring in a pre-loaded but inactive condition. When it is desired to remove the disc from the package, a hand-operated means is provided for selectively releasing the spring so that it will engage a circumferential edge of the disc and forcibly eject it forwardly through the open forward end of the case.

The package is preferably formed of plastic material, with each of its several separate parts being integrally formed in such a way as to provide important elements and characteristics of the assembled package.

SUMMARY OF THE DRAWINGS

FIG. 5 is a transverse cross-sectional view taken on the jog line 5—5 of FIG. 2;

FIG. 6 is a cross-sectional view taken on the line 6—6 of FIG. 5; and

FIG. 7 is a cross-sectional view taken on the line 7—7 of FIG. 5.

Figure 1:
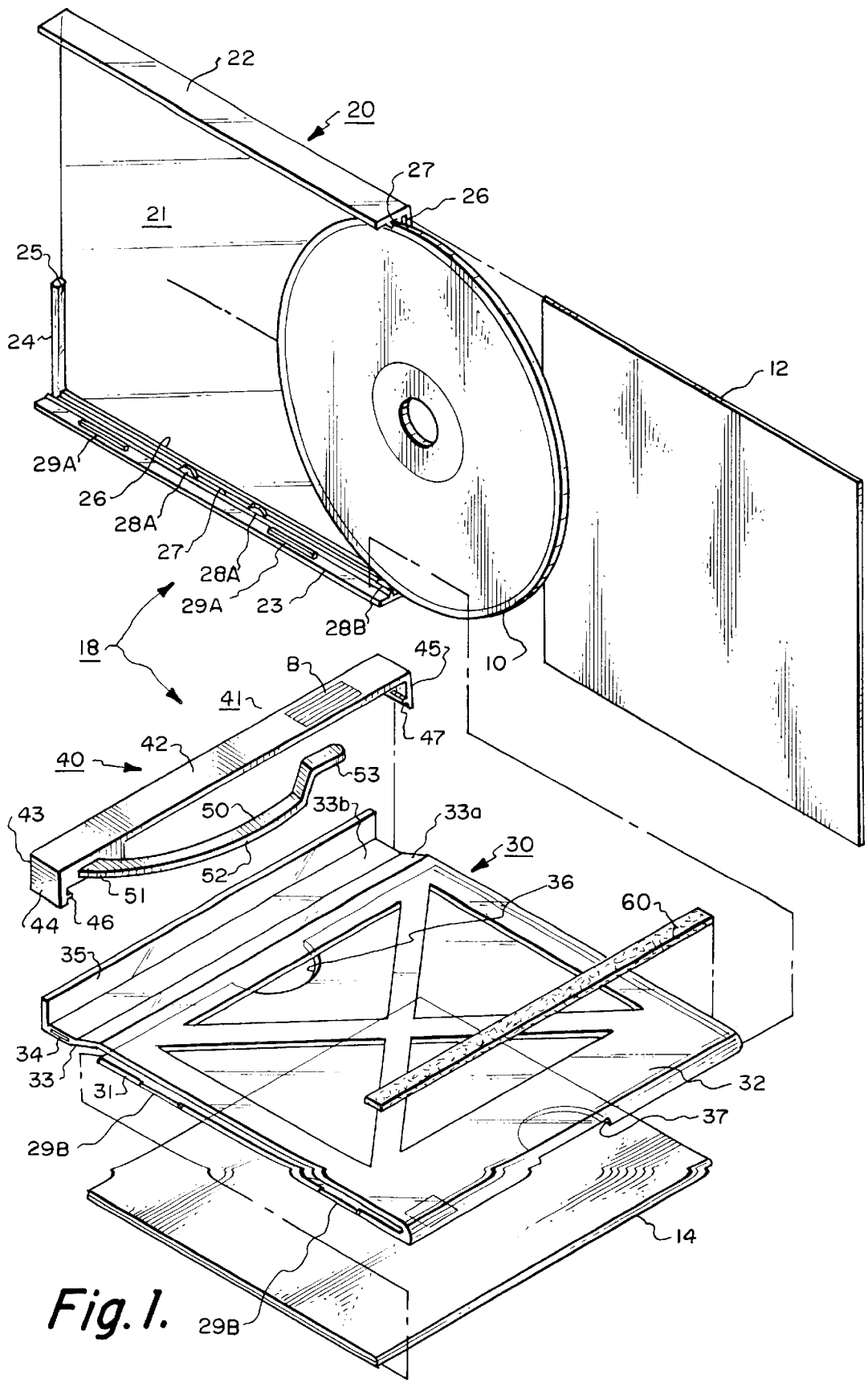
FIG. 1 is an exploded perspective view of both the package and its contents.

DETAILED DESCRIPTION
(FIGS. 1—7)

In the drawings, the compact disc or CD itself is designated by numeral 10, while the customary cover sheet or name plate that goes into the top of the package above the disc is designated 12. Numeral 14 indicates a pamphlet or book of instructions or other information about the recorded contents of the disc, and/or the manner in which the product and/or package should be used. The package as a whole is indicated by numeral 18. The structure of the individual parts of the package will first be described, then the method of assembling the various parts to form the completed package will be described, and thereafter the method of storing or ejecting a CD will be explained.

Principal component parts of the CD case 18 are a top plate assembly 20, a bottom plate assembly 30, and a spring support assembly 40, each of which is an integrally formed plastic part having many-important features. A separate part is the dust wiper or broom 60, which protects the bottom side of the CD from dust. The assembled package is normally open on its forward end, once the shrink-wrap plastic cover has been removed.

Figure 2:
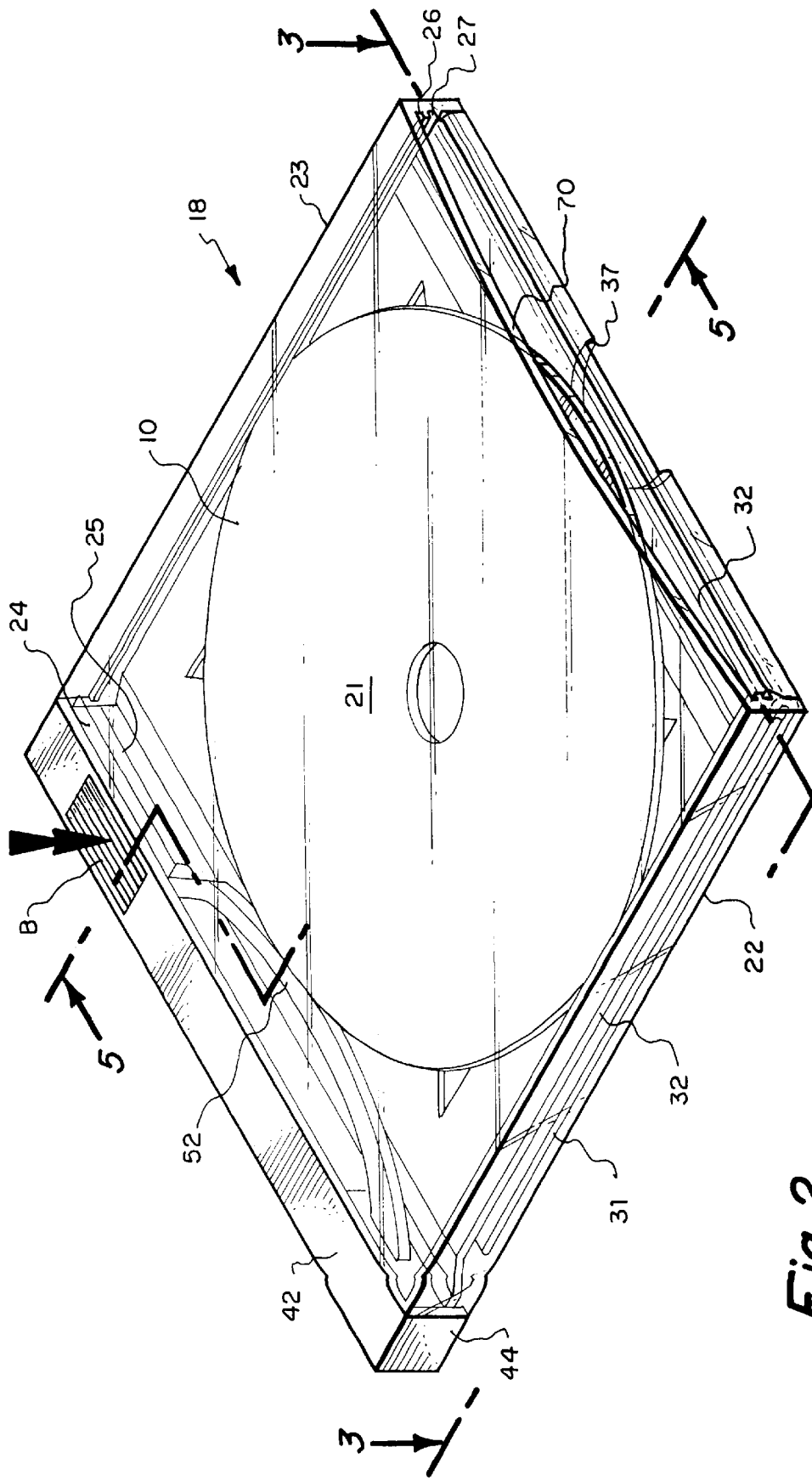
FIG. 2 is a perspective view of the CD case with a CD inside it and the ejection spring in stored position, the plastic top plate being shown only in phantom lines to expose the interior parts, and a large arrow indicating where downward pressure may be applied to release the ejection spring.
Figure 3:
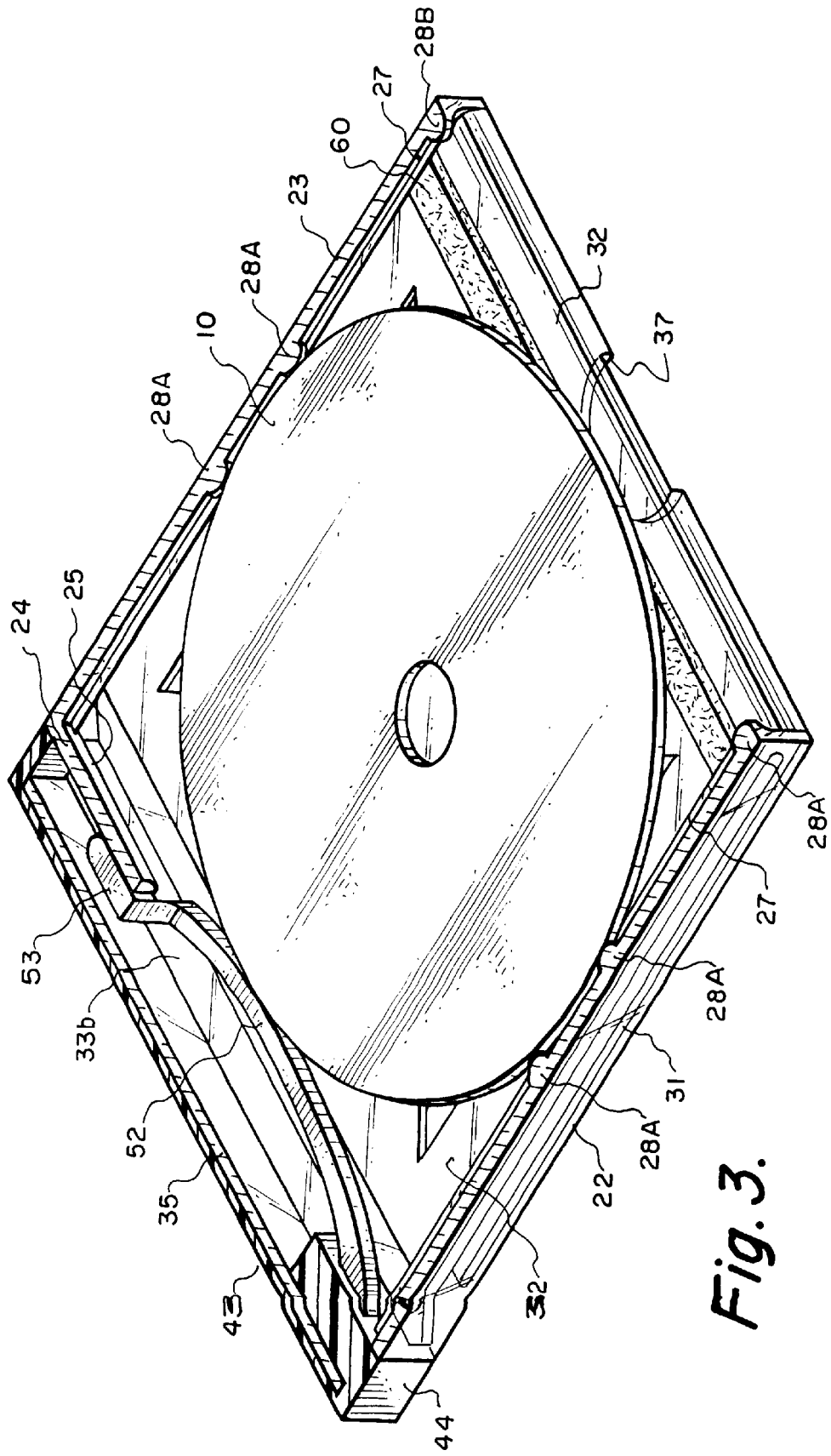
FIG. 3 is a perspective cut-away view taken on line 3—3 of FIG. 2 disclosing interior details of the assembly.

Top plate assembly 20 has a top wall 21 and parallel left and right side walls 22, 23, which depend downwardly from the top wall. A spring retainer rib 24 also depends downwardly from the top wall 21, and extends transversely along a portion of the rear edge of the top wall, as best seen in FIG. 1. The lower front edge of spring retainer rib 24 is curved upwardly at 25, as best seen in FIGS. 2 and 3.

The side walls 22, 23, have a pair of upper grooves 26 on their inner surfaces adjacent top wall 21, which are adapted to slidably receive the name plate or cover sheet 12. A pair of lower grooves 27 in the side walls are further from the top wall 21 and are adapted to receive the CD itself. Two pairs of protrusions or bumps 28A and one pair of protrusions or bumps 28B in respective ones of the lower grooves 27 are important in inserting, storing, or removing the CD from the case, as later discussed. Farthest from the top wall 21 there are small ribs or tongues 29A formed on the inner sides of the side walls 22, 23, which are used in assembling the parts of the case together.

Top plate assembly 20 does not in fact include any kind of a "plate", and that term is used only as a convenient means of differentiating it from the individual "wall" structures. It is necessary for the material from which assembly 20 is formed to have a certain amount of flexibility, as later described.

Bottom plate assembly 30 is also an integrally formed plastic part, with two folded layers including a lower bottom wall 31 and an upper bottom wall 32. Upper bottom wall 32 has a rearward extension 33, with a first portion 33a being angled somewhat downwardly and a second portion 33b being essentially coplanar with the lower bottom wall 31 (see FIG. 5). Extension portion 33b has small grooves 34 on its outer side edges, as seen in FIG. 1 in perspective and in FIG. 5 in cross-section. At the rearward extremity of the rearward extension 33 is a back end wall 35, which rises perpendicularly upward from extension portion 33b, as seen in FIGS. 1 and 5.

The upper bottom wall 32 is partially cut away to save material, leaving a central section in the form of an X. In the perspective view of FIG. 1 the width of both the lower bottom wall 31 and the upper bottom wall 32 appears to be less than the width of extension 33b, but those widths are in fact equal, as clearly shown in FIG. 6.

Spring support assembly 40 is preferably formed as an integral plastic member and includes both a spring support member 41 and the spring member 50. Support member 41 has a top wall 42 the length of which is equal to the external width of the top plate assembly 20 measured between the outer surfaces of the side walls 22, 23. Support member 41 also has a vertical rear wall section 43 that extends downwardly from the rear edge of top wall 42, and whose length is the same as that of the top wall. There are also side pieces 44 and 45, each of which is attached to both the top wall 42 and the vertical rear wall 43. These side pieces on their inner lower surface have corresponding small inwardly extending ribs 46, 47, best seen in FIG. 1, and rib 47 is also seen in FIG. 5. Top wall 42 has a bendable section B, forming a button B that may be used to release the ejection spring. The material of the plastic top wall is preferably cut on two sides and one end, leaving the remaining end as a hinge for the button B. See FIGS. 1, 2, 5, and 7.

Figure 4:
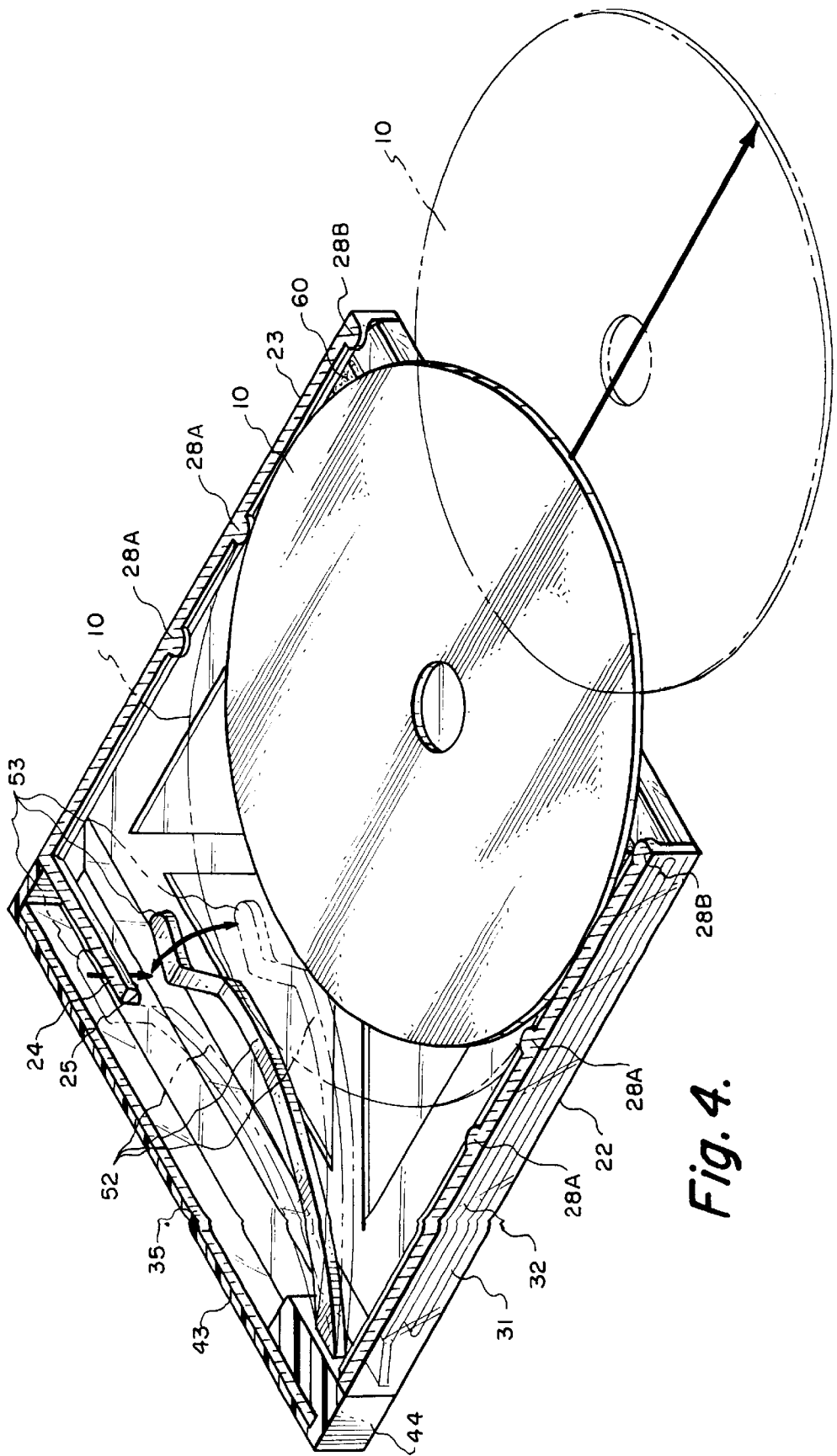
FIG. 4 is a perspective cut-away view like FIG. 3, but showing in dotted lines the action when the disc is ejected by the ejection spring.

Spring member 50 has a fixed end 51 which protrudes outwardly from and is securely affixed to the side piece 44. The ejection spring is an elongated member with a central bent portion 52 and a free end or tab portion 53. For the stored position of the spring, the location of the finger tab 53 is between spring retainer rib 24 and rear end wall 43, and immediately beneath the button B of the top wall 42. However, when the spring is released, operating end 53 moves considerably forward to the forward position shown in dotted lines in FIG. 4.

METHOD OF ASSEMBLING THE PARTS TO FORM THE COMPLETED PACKAGE

The parts are assembled in the following manner. Before placing top plate assembly 20 over the bottom plate assembly 30, the dust broom 60 is placed over the upper bottom wall 32 in a location best seen in FIGS. 1, 3, and 5. Top plate assembly 20 is then placed over the bottom plate assembly 30 such that the side walls 22, 23 of the top plate assembly enclose both the ends of the dust broom and the side edges of the bottom walls 31, 32. The tongues or ribs 29A on the lower inside surfaces of side walls 22, 23, then snap into small grooves 29B in the side edges of lower bottom wall 31, which are shown in FIGS. 1, 5 & 6. The top plate assembly 20 does not cover the rear extension 33 of upper bottom wall 32.

The next task is to attach spring support assembly 40. It is moved vertically downward over the rear extension 33 of upper bottom wall 32, but first making sure that the ejection spring 50 is bent underneath the top wall 42 so that it can occupy its stored position between retainer rib 24 and rear end wall 43. The ribs 46, 47, will snap into engagement with grooves 34 in the edges of upper bottom wall extension 33*b*, as seen in FIG. 5.

When the case has been thus assembled, cover sheet 12 is slipped into upper grooves 26. As seen in FIGS. 1–4, the pamphlet 14 is slipped from the back end of the case into the space between the two bottom walls, above the lower bottom wall 31, being necessarily bent in that process. Half-circle cutouts 36, 37, are formed in the forward and rearward ends of lower bottom wall 31, in order to permit finger gripping of the pamphlet 14 when it is to be inserted or removed.

The CD may then be inserted into the case through the open front end, into the lower pair of grooves 27. As best seen in FIG. 3, the two pairs of bumps 28A then serve to position the CD inside the case, each pair of protuberances being so spaced that when the flat circular member is stored in the box, respective chords of its circumference are retained by the pairs of protuberances 28 on the side walls. As seen in FIG. 2, shown without cover 12, a concave forward edge 70 of top wall 21 facilitates insertion of the CD.

EJECTING THE CD

As best shown in FIG. 5, the bent central portion 52 of spring 50 directly engages an inner circumferential edge of the CD. To eject the CD, the user simply depresses button portion B of the top wall of the spring support assembly. The operating tab 53 will then drop below the retainer rib 24, spring force will drive the central portion 52 of spring 50 against the inner circumferential edge of the CD, culminating in a kicking action by the finger tab 53 with sufficient force to eject the CD from the package. FIG. 3 shows a set of bumps 28B which keep the CD from flying completely out of the package. The CD can then be grasped and pulled the rest of the way out of the package.

RETURNING THE CD TO STORED POSITION

To return the CD to its stored position, it is simply inserted by hand into the open front of the package, and pushed in against the force of spring 50. It pushed against the forward edge the bent central portion 52 of the spring, causing the finger tab 53 to engage curved under surface 25 of spring retainer rib 24, until the tab 53 snaps upward into its stored position. FIG. 3 shows a set of bumps 28B which keep the CD from flying completely out of the package. The CD can then be grasped and pulled the rest of the way out of the package.

While the presently preferred embodiment of the invention has been disclosed in detail in order to comply with requirements of the patent laws, it will be understood by those skilled in the art that many variations are possible within the concept of the invention. For example, instead of using a flexible button B, it may be desired simply to leave an opening in the top wall 42. It will therefore be understood that the scope of the invention is to be determined only in accordance with the appended claims.

What I claim is:

1. A self-ejecting case for a flat circular member such as a compact disc, comprising:

a plastic box having parallel top and bottom walls, parallel side walls, a rear end, and a front end which is open so that the flat circular member may be inserted therein;

a spring member positioned within said box adjacent to said rear end thereof, said spring member having a fixed part that is fixedly secured to said box, and also having a movable part selectively engageable with the flat circular member for pushing it out of said open front end of said box;

means normally restraining said movable part of said spring member from engagement with the flat circular member; and one of said top and bottom walls being adapted to have a force exerted therethrough against said movable part of said spring member for releasing said movable part from its restraint so as to then engage the flat circular member and eject it from said open front end of said box.

2. A self-ejecting case as in claim 1 wherein said one of said top and bottom walls has a flexible portion thereof which is downardly depressible for releasing said movable part of said spring member.

3. A storage case for a flat circular member such as a compact disc, comprising:

a plastic box having top and bottom walls, a rear wall, and a front end which is open so that the flat circular member may be inserted therein between said top and bottom walls;

a spring member inside said box adjacent said rear wall, said spring member having one part that is fixedly secured to said box, and a movable part that when released can directly engage a peripheral edge of the flat circular member;

said box also having a rib that extends inwardly from said top wall thereof;

the movable part of said spring member being normally stored in a retracted position behind said rib; and said top wall of said box also having a flexible portion behind said rib that is downwardly depressible for releasing said movable part of said spring member so as to engage a peripheral edge of the flat circular member and eject it from said open front end of said box.

4. A storage case for a flat circular member, having top and bottom walls, an open forward end and a closed rearward end, a fixed rib depending from one of said top and bottom walls, spring means contained within said rearward end, said rib normally retaining said spring means in a pre-loaded but inactive condition, and means for selectively releasing said spring means so as to directly engage the innermost circumferential edge of the flat circular member and forcibly eject it forwardly through said open forward end of said case while said spring means remains in said rearward end of said storage case.

5. A storage case for a flat circular member such as a compact disc, having an open forward end and a closed rearward end, spring means contained within said rearward end, means normally storing said spring means in a pre-loaded but inactive condition, means for selectively releasing said spring means so as to directly engage the innermost circumferential edge of the flat circular member and forcibly eject it forwardly through said open forward end of said case while said spring means remains in said rearward end of said storage case; the storage case further having top and bottom walls, a fixed rib depending from one of said walls, and wherein said spring means is normally retained by said rib in a pre-loaded but inactive condition.

* * * * *